July 17, 1934.  E. J. DUMM  1,967,052
VIBRATION CUSHIONING DRIVING DEVICE
Original Filed April 20, 1932
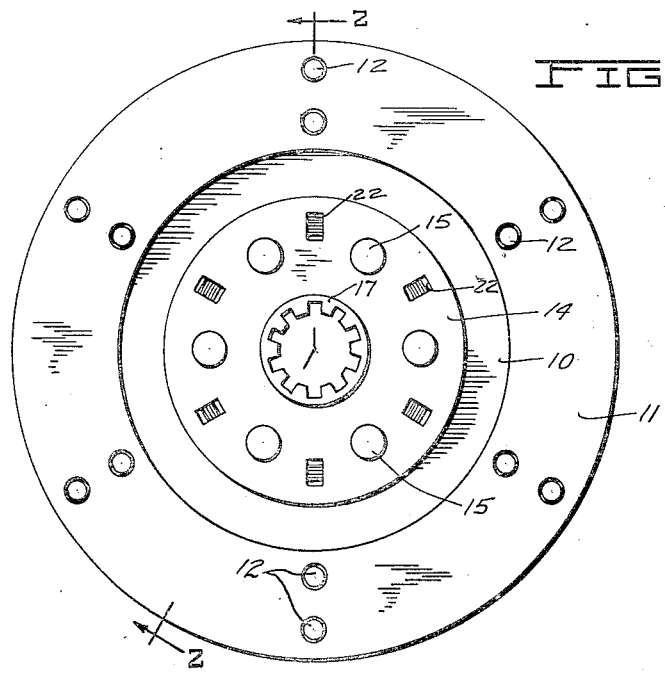
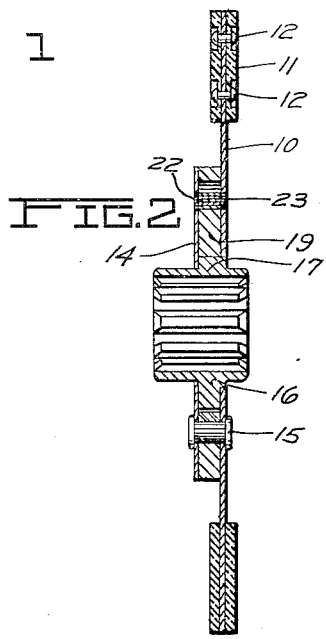
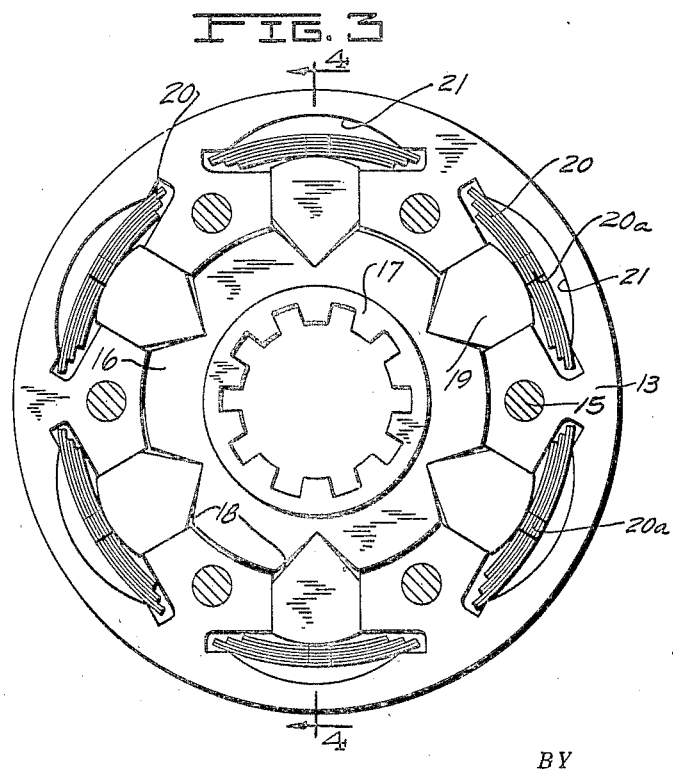
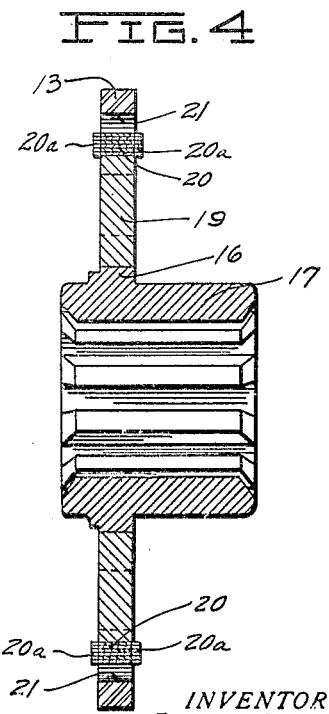
INVENTOR
EDWIN J. DUMM
BY
ATTORNEY Patented July 17, 1934

1,967,052

UNITED STATES PATENT OFFICE 1,967,052

VIBRATION CUSHIONING DRIVING DEVICE

Edwin J. Dumm, Marion, Ohio

Application April 20, 1932, Serial No. 606,369
Renewed March 15, 1934

5 Claims. (Cl. 64—100)

This invention relates to vibration cushioning driving devices, and is particularly useful in motor vehicle drives.

With the demand for greater acceleration in motor cars, the automotive designer lightened all reciprocating parts of the motor as well as the crankshaft and fly-wheel. This, and due to the fact that the compression ratio was increased, gave rise to an annoying vibration, which was first detected by a rattle in the transmission gears. Much of this noise was transmitted from the crank-shaft back through the clutch.

To remedy this fault the clutch manufacturer introduced the clutch plate or driven member with a flexible center.

Since the introduction of these flexible plates, many designs have been manufactured. These designs used fabric, rubber and coil and cantilever springs as a flexing medium.

The plates in which fabric and rubber is the flexible medium, are not successful due to the fact that this flexing material disintegrates or breaks down in use.

The plates using coil springs as a flexing medium have not as yet been successful. This is primarily due to faulty design, in that the springs have been mounted circumferentially about the plate. When these springs are under load, the parts of the coils nearest the center of the plate are more highly stressed than the parts of the coils farther from the center. Due to this unequal stressing, the springs invariably break after the plate has been in service only a short time.

Laminated cantilever springs have been used in certain designs, but not successfully. This condition is also caused by poor design, as the springs are of necessity confined at one end. The greatest stress in the spring comes nearest the confined end and the springs often break after short service.

The object of this invention is to provide a flexible means for transmitting motion from a driving to a driven member.

This device can be used in connection with clutch plates or flexible joints, or between two shafts, altho not confined thereto.

The accompanying drawing shows the device as applied to a clutch plate, and Fig. 1 is a front elevation of a flexible drive member; Fig. 2 is a section taken on line 2—2 of Fig. 1; Fig. 3 is an enlarged view of the vibration cushioning device. Fig. 4 is a section of the line 4—4 of Fig. 3.

The disc 10 to which the facings 11 are riveted by rivets 12 is the driving part of the plate. The drive ring 13 is riveted to disc 10 on one side and to a retaining washer 14 on the other. The flange 16 of the hub 17 being slightly thinner than the thickness of the drive ring 13 allows the hub 17 to have a slight free rotary motion with respect to the disc 10. The outer edge of the flange of the hub 17 carries a series of V-shaped notches or cams 18. Dogs or plungers 19 are set in these notches and are actuated outwardly or radially from the center with any rotary movement of the disc 10 relative to the hub 17. This outward movement of the plungers is restrained by a solid or laminated, elliptic, semi-elliptic, or coil spring or by any other resilient material. In the form shown this outward movement of the plungers 19 may continue as the disc 10 moves relative to the hub until the springs 20 are bowed and lay for their full length against the outer wall of recesses 21 in the drive ring 13. When this full movement has taken place with the disc 10 transmitting motion to the hub 17 these plungers 19 serve as a means of a stop and prevent any further rotary movement of the disc 10 relative to the hub 17.

These springs as laminated are formed with oppositely projecting parts 20a in their mid-section, which fit in corresponding slots 22 in the disc 10 and in the retaining washer 14. This construction maintains the spring leaves in correct relation to each other without the necessity of pinning them together. This allows the spring to flex thru its whole length, thereby distributing the stress evenly and prolonging its life.

Due to the construction the hub 17 has a slight universal joint effect, which is desirable in a drive where the driving and the driven member are not in exact alignment.

In clutch plate construction it is desirable to have a snubbing or retarding movement to the backlash of the spring. The friction between the plungers 19 and their ways in the drive ring 13 and the friction between the leaves of the cantilever springs supplies this action. With this construction as shown, if for any reason one of the leaves of the spring should break, it will still remain in its allotted space and still serve to maintain the required spring tension.

It will be noted that this structure provides a flexing means in which there is no friction put on the springs. When the hub wears directly on the springs it tends to shove them lengthwise and wear the corners of the hub. With a slight amount of wear the hub becomes loose and there is a great amount of lost motion between the hub and plate. In my structure the wedge shaped end of each plunger is made with an angle more acute than the notch in which it works. In action it tends immediately to return the hub to its neutral position. Also the angle of the end being more acute than the mating notch in the hub flange it allows the edge of the plunger to have a full bearing along the edge of the notch in the hub when the plunger has traveled to its outer limit and is under the greatest load.

The device may be modified in various ways within the scope of the invention.

I claim:

1. The combination with rotary driven and driving members, one of said members having notches with inclined cam faces, of spring pressed plungers carried by the other member and having inclined ends fitting in said notches, the angle of inclination of the ends being less than that of the cam faces.

2. The combination stated in claim 1, said plungers being movable radially against the tension of the springs by pressure of the cam faces against said inclined ends, and means to stop the radial movement of the plungers to form a positive driving connection.

3. The combination stated in claim 1, the relative angles being such that at the limit of movement of the plungers the inclined faces are in parallel contact with the cam faces.

4. The combination with a hub having a flange provided with cam faces, of a ring surrounding said flange, said ring having radial guide ways and elongated recesses extending across the outer ends of said guide ways, radially movable plungers in said guide ways and bearing at their inner ends against said cam faces, and bow springs in said recesses, extending in the plane of the flange across the outer ends of the plungers, and a ring plate and a washer plate embracing said flange and secured to said ring, the plates having radial guide openings, and the springs having retaining projections working in said openings.

5. The combination with a hub having a flange provided with cam faces, of a ring surrounding said flange, said ring having radial guide ways and elongated recesses extending across the outer ends of said guide ways, radially movable plungers in said guide ways and bearing at their inner ends against said cam faces, and bow springs in said recesses, extending in the plane of the flange across the outer ends of the plungers, the springs being confined in recesses in the ring and bearing against the ring at the ends of the recesses and bearing against the plungers between said ends, the outer wall of the recesses forming a stop to limit the flexion of the springs.

EDWIN J. DUMM.